United States Patent Office 3,263,087
Patented July 26, 1966

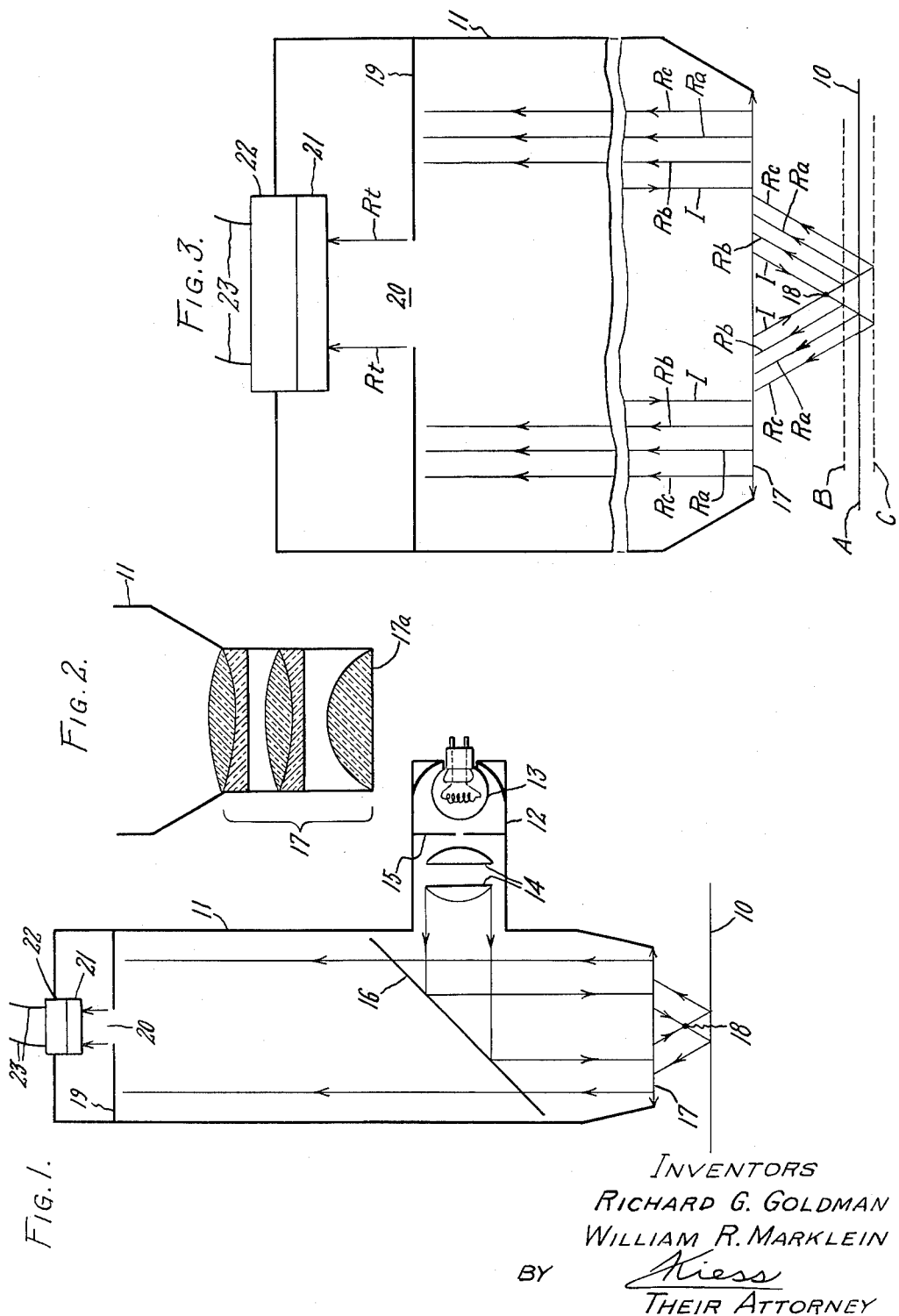

3,263,087
ELECTRO-OPTICAL DISTANCE GAGE
Richard G. Goldman and William R. Marklein, Schenectady, N.Y., assignors to General Electric Company, a corporation of New York
Filed Mar. 27, 1963, Ser. No. 268,358
3 Claims. (Cl. 250—224)

The present invention relates to a method and apparatus for measuring very small movements of a surface by means of a light beam and more specifically relates to measuring such movements by means of a new and improved method and apparatus for varying the light intensity reflected from the surface.

Previous devices for measuring small variations of the position of plane surfaces or of the plane in which smooth, rapidly moving surfaces are located, have been limited in accuracy and sensitivity by the necessity of contacting the surface in question, by the non-linearity of their response, or by their sensitivity to environmental changes.

To overcome some of these difficulties, gages have been proposed which depend on the intensity variation of a light beam with the distance traveled by the beam. However, this effect has been found to be extremely weak and, therefore, the device is still very insensitive to small changes in the position of the surface.

The present invention is directed to a method and apparatus which overcome the above-mentioned difficulties of inaccuracy and insensitivity while providing a linear output which is relatively independent of the environmental conditions.

It is therefore an object of the present invention to provide a new and improved electro-optical distance gage which is highly sensitive and accurate.

A further object of the present invention is the provision of a new and improved electro-optical distance gage which is adapted to provide a highly accurate, linear output for small movements of either specular or dispersive surfaces.

Briefly, in accordance with one form of the present invention, a beam of radiation, for example light, is focussed near a reference plane at which it is desired to maintain a surface. Radiation is reflected from the surface as a second beam and is magnified by a lens system. The magnification increases the size of the resultant beam whereby useful information can be obtained from the device. The beam then travels to a radiation-sensitive means, for example a photocell, which detects and indicates changes in the intensity of radiation incident on the photocell. When the surface moves from the reference plane by a small distance, the size of the concentrated spot on the surface changes and the size of the reflected beam changes correspondingly. This change will be further magnified by the lens system. Means defining an aperture, for example an iris, is interposed in the path of the reflected beam to limit substantially the portion of the magnified beam which is admitted to the radiation-sensitive means so that the beam portion incident thereon has a constant size. Thus, as the position of the surface varies (towards and away from the lens), the intensity of that portion of the total illumination which reaches the radiation-sensitive means varies in accordance with the displacement of the surface.

The novel features believed characteristic of the present invention are set forth in the appended claims. The invention itself, together with further objects and advantages thereof, may best be understood by reference to the following description taken in connection with the appended drawings, in which:

FIGURE 1 is a schematic illustration of apparatus constructed in accordance with the present invention;

FIGURE 2 is an illustration of a representative lens system appropriate for use in FIGURE 1;

FIGURE 3 is an enlarged view of selected portions of FIGURE 1; and

Figure 4:
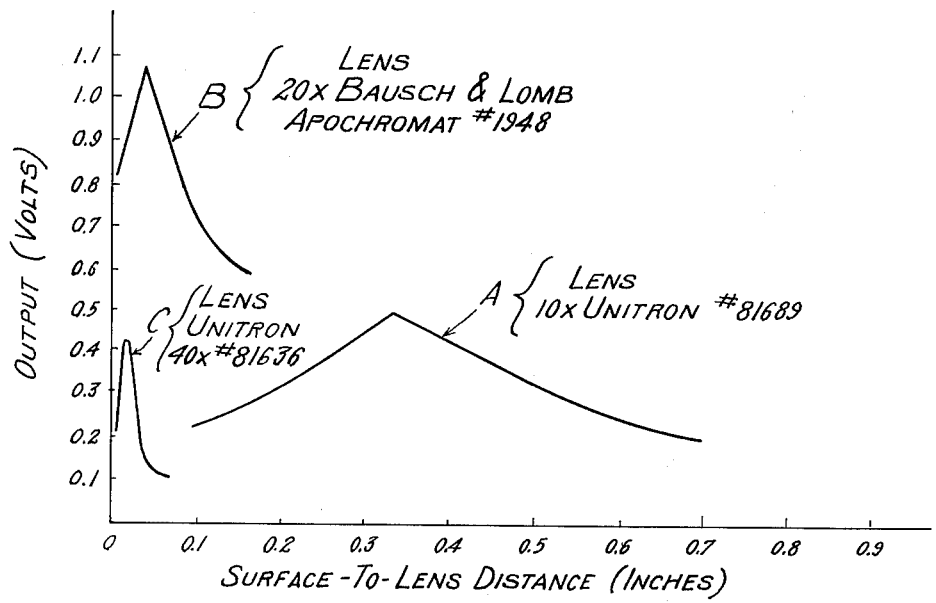
FIGURES 4 and 5 are graphical representations of data obtained in accordance with the present invention.

Referring specifically to FIGURE 1, a distance gage is illustrated for accurately measuring the displacement from a lens system of a surface 10. The distance gage comprises housing 11 having an extension 12 which encloses a suitable source of radiation, for example light bulb 13. In the preferred form, collimating means, for example lenses 14 and apertured diaphragm 15, are provided in the path of the radiation. A half-silvered mirror 16, or other equivalent device such as a prism or a "beam splitter," is provided in the path of the radiation to reflect at least a portion of the radiation toward the surface 10. A lens system, indicated schematically at 17, forms an image at a point 18. The radiation is reflected from surface 10, collected and magnified by lens system 17 and passed through mirror 16 to iris 19 which defines an aperture 20 substantially smaller than the magnified image. The beam portion passed by aperture 20 impinges upon radiation-sensitive surface 21 of a photocell 22 which is connected through leads 23 to an appropriate indicating device such as an oscilloscope, not shown.

In accordance with the present invention, lens system 17 comprises an optical magnifying system such as a microscope objective lens. FIGURE 2 illustrates a specific example of a lens system which could appropriately be used at 17 in FIGURE 1. The metallurgical microscope objective lenses manufactured and sold by the Unitron Instrument Company, supplied in 5, 10, 40 or 100 power, for the Unitron Model MMU metallurgical microscope are suitable. Alternatively, the 20 power achromatic objective lens designated C112 and sold by the American Optical Company could be used.

The operation of the apparatus of the present invention will be better understood by a consideration of FIGURE 3, which comprises an enlarged view of two portions of FIGURE 1, namely, the base of housing 11 including lens system 17 together with surface 10 and the upper portion of housing 11, including iris 19 and photocell 22. For purposes of clarity, the respective radiation beams are indicated by letters at the boundary lines of each beam. Thus, in FIGURE 3, the beam reflected from mirror 16 is contained within the boundary lines marked "I."

In operation, the radiation making up beam I passes through the focal point 18 of the lens and impinges on surface 10. If the surface 10 is located in the desired reference plane indicated by A in FIGURE 3, the reflected beam will follow the path denoted by boundary lines $R_a$ and, as indicated, will be magnified by lens system 17, from whence it passes to iris 19 and aperture 20. Since the radiation incident on surface 10 is a constant, the total light or illumination in beam $R_a$ will be constant and, as long as surface 10 remains at position A, the size of the reflected and magnified beam impinging on iris 19 will also remain constant. Since the intensity, that is, light per unit area, is constant, the illumination of the transmitted beam $R_t$ which passes through aperture 20 will remain constant. If, however, surface 10 varies to either position B or position C indicated in FIGURE 3, the reflected beam will follow the path of, respectively, $R_b$ or $R_c$. Thus, the constant total illumination of beam I will be spread over a lesser or greater area, depending on the displacement of surface 10 towards or away from the lens 17.

Due to the magnification power of lens system 17 (which may be selected, for example, from 5 to 100 power), the intensity of the beam incident on iris 19 will vary in magnified proportion to the displacement. Thus the illumination of the transmitted beam $R_t$ will vary in accordance with the position of surface 10. If surface 10 moves closer to the lens system 17, the beam will become smaller, increasing the intensity and thus increasing the illumination transmitted by aperture 20. If surface 10 moves away from the lens system, the area of the reflected beam will expand, thus decreasing the intensity of the portion of the beam transmitted by aperture 20. It can be shown theoretically, and it has been found experimentally, that over small distances, the relation between movement of surface 10 and change in the light incident upon radiation-sensitive surface 21 is linear if aperture 20 is substantially smaller than the size of the reflected beam for all positions of surface 10 in the range to be measured.

Thus, the magnification of the beam by the lens system 17 and the introduction of iris 19 in the path of the reflected beam, so that the beam is always larger than the aperture 20, combine to produce an extremely sensitive device for measuring distance. For example, movements as small as 0.1 micron ($10^{-5}$ centimeter) have been measured. In the case of a surface (such as on a high-speed rotor) having a periodic deviation from plane A, movement occurring in times as short as 1 nanosecond ($10^{-9}$ second) has also been measured.

It has been found that the sensitivity of the apparatus of the present invention depends on the magnification power of the lens system 17. A number of tests utilizing various lens systems have been conducted and the results are compared in FIGURE 4. The data was taken using an instrument constructed by modifying a standard Unitron MMU metallurgical microscope. The photosensor 22 used was a Dumont multiplier phototube, type K–1732. In each case, a visible light beam was brought to focus on a white plastic tape surface and the output of the sensor was recorded as the device was moved to either side of the focal point 18. Curves A, B and C of FIGURE 3 were taken utilizing a ten-power Unitron objective lens, catalogue number 81689, a twenty-power Bausch & Lomb objective lens, catalogue number 1948, and a forty-power Unitron objective lens, catalogue number 81636.

With regard to curve A, taken using the ten-power Unitron lens, the focal point of the lens was 0.345 inch from the front surface 17a of lens 17. The location of the focal point is shown in FIGURE 4 as being at the sharp peak or "inflection point" of the curves A, B, C. The range over which output varied linearly with displacement was 0.150 inch and the sensitivity was 1.0 millivolt per mil displacement of surface. With regard to curve B, taken using the twenty-power Bausch & Lomb lens, the focal point of the lens was at 0.040 inch. The linear range was 0.040 inch and the sensitivity was 5.0 millivolts per mil displacement of surface. With regard to curve C, taken using the forty-power Unitron lens, the focal point fas a 0.020 inch. The linear range was 0.015 inch and the sensitivity was 20 millivolts per mil displacement of surface. Thus, as the magnification power of the lens was increased from 10 to 20 to 40, the sensitivity increased from 1 to 5 to 20 mv./mil.

The above discussion applies in case of surfaces having relatively constant color and reflective properties. The degree of uniformity required depends on the precision of the measurement being made. When a deformation of 0.1 micron is being measured, the character of the reflective surface must be substantially constant throughout the measuring. In measuring to an accuracy of 0.001 inch, some contamination on the surface, such as oil and dirt, does not significantly affect the measurement. In the case of dispersive surfaces, that is, surfaces which are approximately smooth but which contain sufficient variations to spread the incident radiation over a wide reflected range, the portion of housing 11 which surrounds lens system 17 will act as an aperture in much the same manner as iris 19 and aperture 20. As the position of surface 10 varies, more or less radiation is intercepted by lens system 17, thus introducing a variation in the intensity of the beam in the same manner as described above. The magnification introduced by lens system 17 and the blocking by iris 19 increase this effect so that a highly sensitive output is achieved.

In either case, it has been found that, for example over ranges varying between 0.01 and 0.15 inch, the relation between the portion of total illumination which passes through aperture 20 and the change in the position of surface 10 is linear. That is, if movement of surface 10 is to be measured linearly, the distance between position B and position C (FIG. 3) may vary from 0.01 to 0.15 inch, depending on the lens system used.

Figure 5:
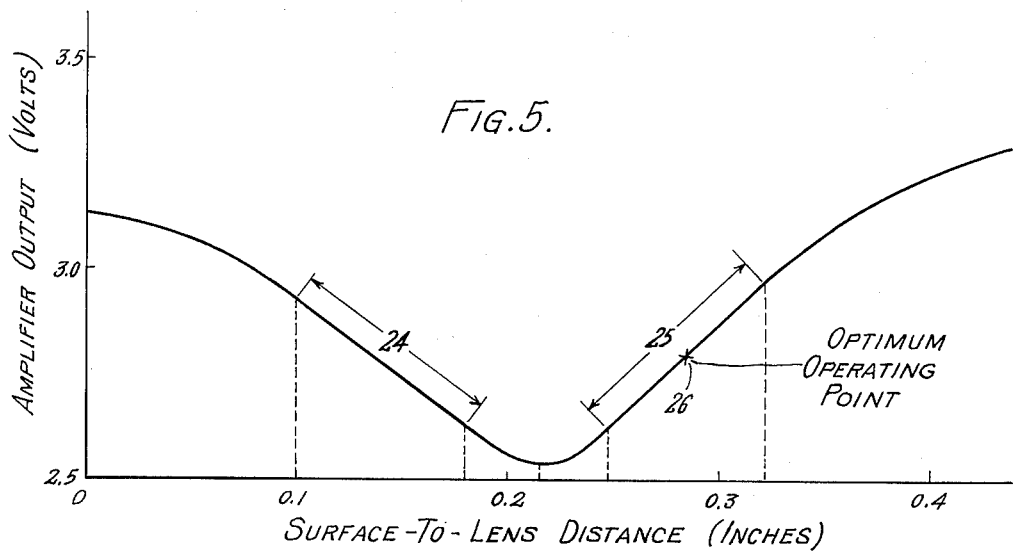

FIGURE 5 represents a curve obtained by plotting the amplified output of a type LS223 silicon photovoltaic cell manufactured by the Texas Instrument Company as the surface-to-lens distance was changed. (The curve shown here is inverted with regard to the similar curves shown in FIGURE 4 because of a polarity reversal introduced by a preamplifier used between the light sensor and the indicating device.) The surface used for these measurements was a reflective white tape, the lens had a focal length of 0.215 inch, and a magnification power of 20, and a digital voltmeter was used as the indicating meter. The sensitivity was found to be 4.67 millivolts per mil displacement of the surface 10.

The portions 24 and 25 of FIGURE 5 indicate ranges wherein the response or output varied linearly with the surface displacement. Both of these extend over a range of approximately 0.075 inch. The center of area 25 occurs at point 26, which is 0.285 inch from the lens surface, from which it can be seen that this is the reference position A (FIGURE 3). That is, the lens-to-surface distance for the reference position A should be 0.285 inch. Variation of the surface in either direction over a distance of 0.037 inch or less will then be indicated linearly.

Although high-powered lenses give high sensitivity, the linear range is decreased and the surface-to-lens distance must be significantly shorter. The use of relatively low power lenses, as indicated in FIGURE 5, decreases the sensitivity but increases the surface-to-lens distance and linear range.

The above-described system is particularly well adapted for measuring for measuring variations in conjunction with rotating machinery. The phase of a displacement occurring on a cylindrical rotating surface can be determined by marking the surface at a suitable reference point with an index mark which sharply changes the local reflectivity, and then measuring the circumferential location of the displacement with respect to the index mark, for example, by indicating the photocell output on an oscilloscope.

Although a particular embodiment of the invention has been shown and described, it is intended to cover by the appended claims all modifications and embodiments falling within the true spirit and scope of the invention. For example, any appropriate source of radiant energy may be utilized, whether reflected as described, or otherwise emitted from the surface 10. Also, substitutions of equivalents may be made in the optical system, and any preferred type of radiation-sensitive device may be used instead of the photocells shown. One end of a glass fiber bundle type of optic light guide may be placed at 22 and the light may be conducted to a remote location for measuring purposes. Instead of the iris 19, the radiation-sensitive means 21 itself may be made of a size as to always be smaller than the reflected beam so that the varying intensity of the portion of the beam intercepted by the device 21 is measured.

What we claim as new and desire to secure by Letters Patent of the United States is:

1. A device for indicating displacement of a surface from a reference position comprising:
    (a) means providing a concentrated beam of radiation emanating from said surface which varies in size as the surface is displaced from said reference position;
    (b) lens means for magnifying the varying size of said beam;
    (c) radiation-sensitive means disposed in the path of the magnified beam for detecting changes in the amount of radiation incident thereon; and
    (d) means defining an aperture disposed in the path of said beam between said magnifying means and said radiation-sensitive means for limiting the portion of said magnified beam which reaches said radiation-sensitive means,
    (e) the size of said aperture being smaller than the smallest size of the magnified beam at the location of the aperture-defining means.

2. A device for indicating displacement of a reflective surface from a reference position comprising:
    (a) means for producing a first beam of radiant energy directed to impinge on the surface so as to provide a reflected beam which varies in diameter according to movements of the surface from the reference position;
    (b) lens means for magnifying the size of the beam of energy reflected from the surface;
    (c) radiation-sensitive means disposed in the path of the magnified reflected beam for detecting changes in the amount of radiation incident thereon; and
    (d) means defining an aperture disposed in the path of said reflected beam for limiting the portion of the magnified beam which reaches said radiation-sensitive means;
    (e) the diameter of said aperture being smaller than the diameter of the magnified beam over the entire range of operation of the device, whereby the portion of the beam reaching the radiation sensitive means is smaller than the smallest size of the beam impinging on the apertured means.

3. A device for indicating displacement of a substantially uniformly reflective surface from a reference position comprising:
    (a) an elongated housing having first and second end portions;
    (b) said housing having an extension intermediate said end portions and disposed transverse to the longitudinal axis of the housing and enclosing means emitting a first collimated beam of radiant energy;
    (c) a semi-transparent mirror disposed in the housing to reflect a substantial portion of said first beam into a path along the axis of the housing toward said first end portion thereof;
    (d) a magnifying lens system disposed adjacent the first end portion of the housing for focusing the portion of the first collimated beam reflected by said mirror at a focal point near the surface and for magnifying the beam of radiation reflected from said surface, a substantial portion of the magnified collimated beam passing through the mirror axially through the housing towards the second end portion thereof;
    (e) radiation-receptive means disposed in said second end portion of the housing for detecting changes in the amount of radiation incident thereon; and
    (f) means defining an aperture disposed in the path of the magnified beam between the mirror and the radiation-receptive means for limiting the portion of the magnified beam which reaches the radiation-receptive means;
    (g) the diameter of said aperture being smaller than the diameter of the magnified beam reaching the aperture over the entire range of operation of the device.

References Cited by the Examiner

UNITED STATES PATENTS

| 2,437,608 | 3/1948 | Long et al. | 88—14 |
| 2,502,503 | 4/1950 | Berkley | 88—14 |
| 2,606,297 | 6/1952 | Sweet | 250—218 |
| 2,665,388 | 1/1954 | Bickley | 250—237 |
| 3,016,464 | 1/1962 | Bailey | 250—219 |

RALPH G. NILSON, *Primary Examiner.*

MARTIN ABRAMSON, *Assistant Examiner.*